US012567441B2

(12) United States Patent
Kurihara et al.

(10) Patent No.: US 12,567,441 B2
(45) Date of Patent: Mar. 3, 2026

(54) MAGNETIC RECORDING DEVICE AND A METHOD FOR MANUFACTURING THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Kosuke Kurihara, Yokohama Kanagawa (JP); Yousuke Isowaki, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/983,016

(22) Filed: Dec. 16, 2024

(65) Prior Publication Data

US 2025/0273238 A1 Aug. 28, 2025

(30) Foreign Application Priority Data

Feb. 26, 2024 (JP) ................................. 2024-026755

(51) Int. Cl.
| | |
|---|---|
| *G11B 27/36* | (2006.01) |
| *G11B 5/024* | (2006.01) |
| *G11B 5/596* | (2006.01) |
| *G11B 20/18* | (2006.01) |
| *G11B 5/00* | (2006.01) |

(52) U.S. Cl.
CPC .......... *G11B 5/59672* (2013.01); *G11B 5/024* (2013.01); *G11B 5/59638* (2013.01); *G11B 2005/0021* (2013.01); *G11B 5/59661* (2013.01)

(58) Field of Classification Search
CPC .... G11B 5/54; G11B 5/00; G11B 5/09; G11B 27/36; G11B 5/58; G11B 20/18; G11B 20/12; G11B 5/59633; G11B 5/59638
USPC ................................................ 360/48, 31, 53
See application file for complete search history.

(56) References Cited

U.S. PATENT DOCUMENTS

| | | | |
|---|---|---|---|
| 9,245,560 B1 * | 1/2016 | Nie ......................... | G11B 5/455 |
| 9,911,446 B1 | 3/2018 | Ahner et al. | |

* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a magnetic recording device includes a magnetic recording medium, a magnetic head configured to record information on the magnetic recording medium, and a controller configured to control the magnetic recording medium and the magnetic head. The magnetic head includes a coil, a first magnetic pole configured to generate a magnetic field according to a recording current supplied to the coil, and a light emitting section configured to irradiate the magnetic recording medium with a light to locally increase a temperature of the magnetic recording medium. The controller is configured to perform a first operation and a second operation. In the first operation, the controller is configured to record a first servo position information in a first region of the magnetic recording medium. In the second operation, the controller is configured to perform a repair operation if a first condition is not satisfied.

15 Claims, 6 Drawing Sheets

MAGNETIC RECORDING DEVICE AND A METHOD FOR MANUFACTURING THE SAME

CROSS-REFERENCE TO RELATED APPLICATIONS

This application is based upon and claims the benefit of priority from Japanese Patent Application No. 2024-026755, filed on Feb. 26, 2024; the entire contents of which are incorporated herein by reference.

FIELD

Embodiments described herein relate generally to a magnetic recording device and a method for manufacturing the same.

BACKGROUND

In a magnetic recording device, information is recorded on a magnetic recording medium such as an HDD (Hard Disk Drive) using a magnetic head. In magnetic recording devices, it is desired to improve productivity.

DETAILED DESCRIPTION

Figure 1:
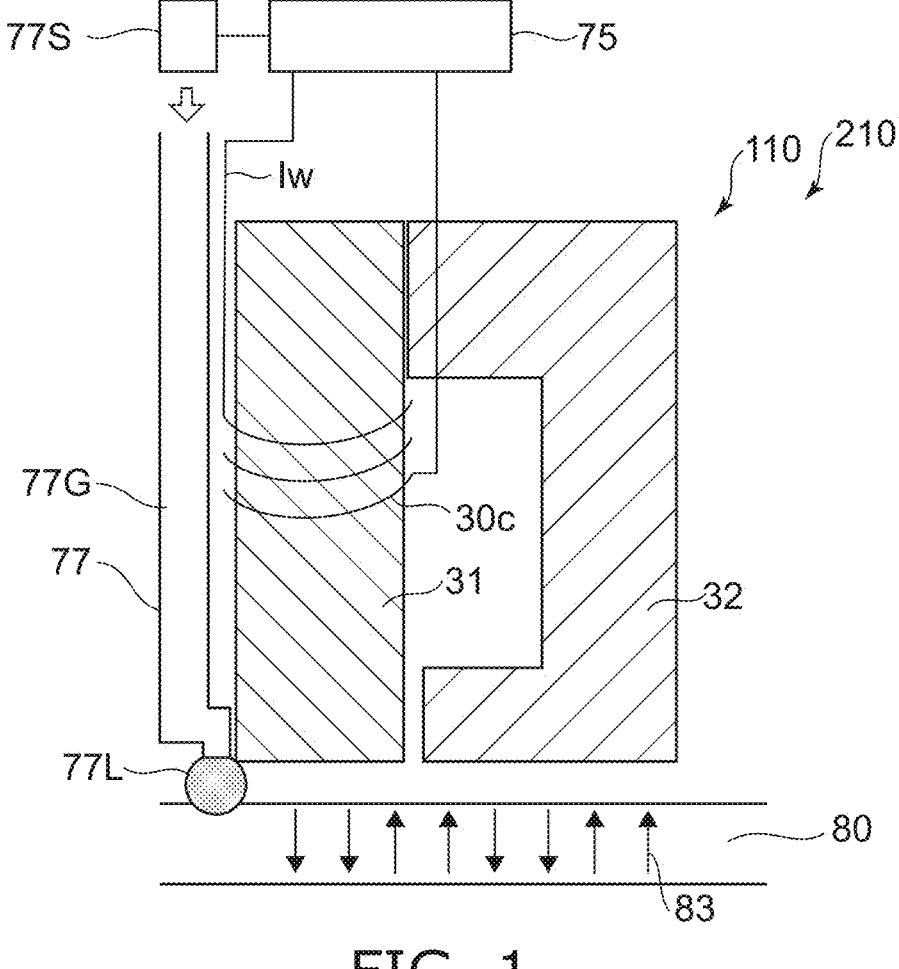
FIG. 1 is a schematic view illustrating a magnetic recording device according to a first embodiment.

According to one embodiment, a magnetic recording device includes a magnetic recording medium, a magnetic head, and a controller. The magnetic head is configured to record information on the magnetic recording medium. The controller is configured to control the magnetic recording medium and the magnetic head. The magnetic head includes a coil, a first magnetic pole, and a light emitting section. The first magnetic pole is configured to generate a magnetic field according to a recording current supplied to the coil. The light emitting section is configured to irradiate the magnetic recording medium with a light to locally increase a temperature of the magnetic recording medium. The controller is configured to perform a first operation and a second operation. In the first operation, the controller is configured to record a first servo position information in a first region of the magnetic recording medium. In the second operation, the controller is configured to perform a repair operation if a first condition is not satisfied. The first condition includes a condition that a recording condition of the first servo position information is within a first range being determined. In the repair operation, the controller is configured to perform an erasing operation of irradiating the first region with the light from the light emitting section to perform a re-recording operation of re-recording the first servo position information in the first region after the erasing operation.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic view illustrating a magnetic recording device according to a first embodiment.

As shown in FIG. 1, a magnetic recording device 210 according to the embodiment includes a magnetic recording medium 80, a magnetic head 110, and a controller 75. The magnetic head 110 is configured to record information on the magnetic recording medium 80. The controller 75 is configured to control the magnetic recording medium 80 and the magnetic head 110.

The magnetic head 110 includes a coil 30c and a first magnetic pole 31. The first magnetic pole 31 generates a magnetic field (recording magnetic field) according to a recording current Iw supplied to the coil 30c. The generated magnetic field is applied to the magnetic recording medium 80. Thereby, the direction of magnetization 83 of magnetic recording medium 80 is controlled. The state of magnetization 83 corresponds to the information to be recorded. In this example, the magnetic head 110 further includes a second magnetic pole 32. The first magnetic pole 31 is, for example, a main magnetic pole. The second magnetic pole 32 is, for example, a trailing shield.

The magnetic head 110 further includes a light emitting section 77. The light emitting section 77 is configured to irradiate the magnetic recording medium 80 with light 77L to locally increase the temperature of the magnetic recording medium 80.

For example, the light emitting section 77 includes a light source 77S and a light guide 77G. The light 77L emitted from the light source 77S is guided by the light guide 77G. The light 77L emitted from the light guide 77G is emitted to the magnetic recording medium 80 via, for example, an optical element. The light source 77S is, for example, a laser.

Hereinafter, an example of the operation of the controller 75 will be described.

Figure 2:
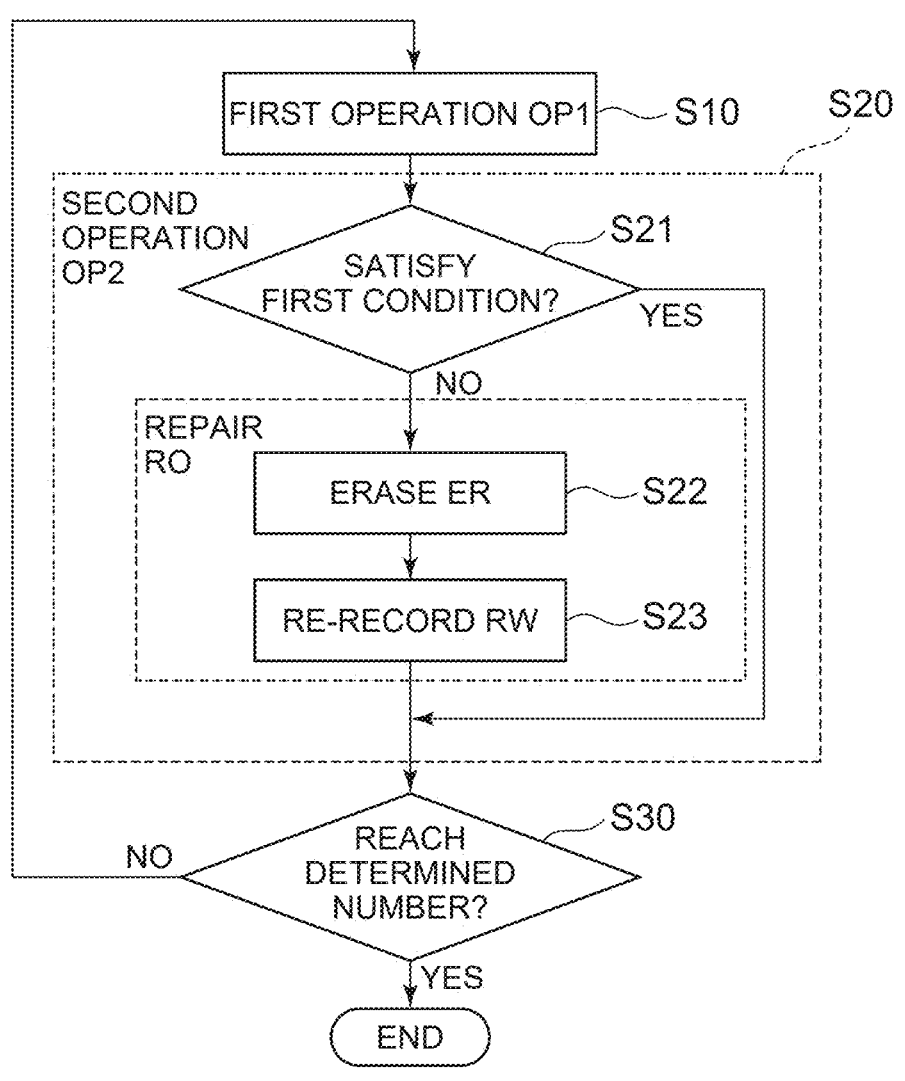
FIG. 2 is a flowchart illustrating an operation of the magnetic recording device according to the first embodiment.

FIG. 2 is a flowchart illustrating an operation of the magnetic recording device according to the first embodiment.

Figures 3A, 3B, 3C:
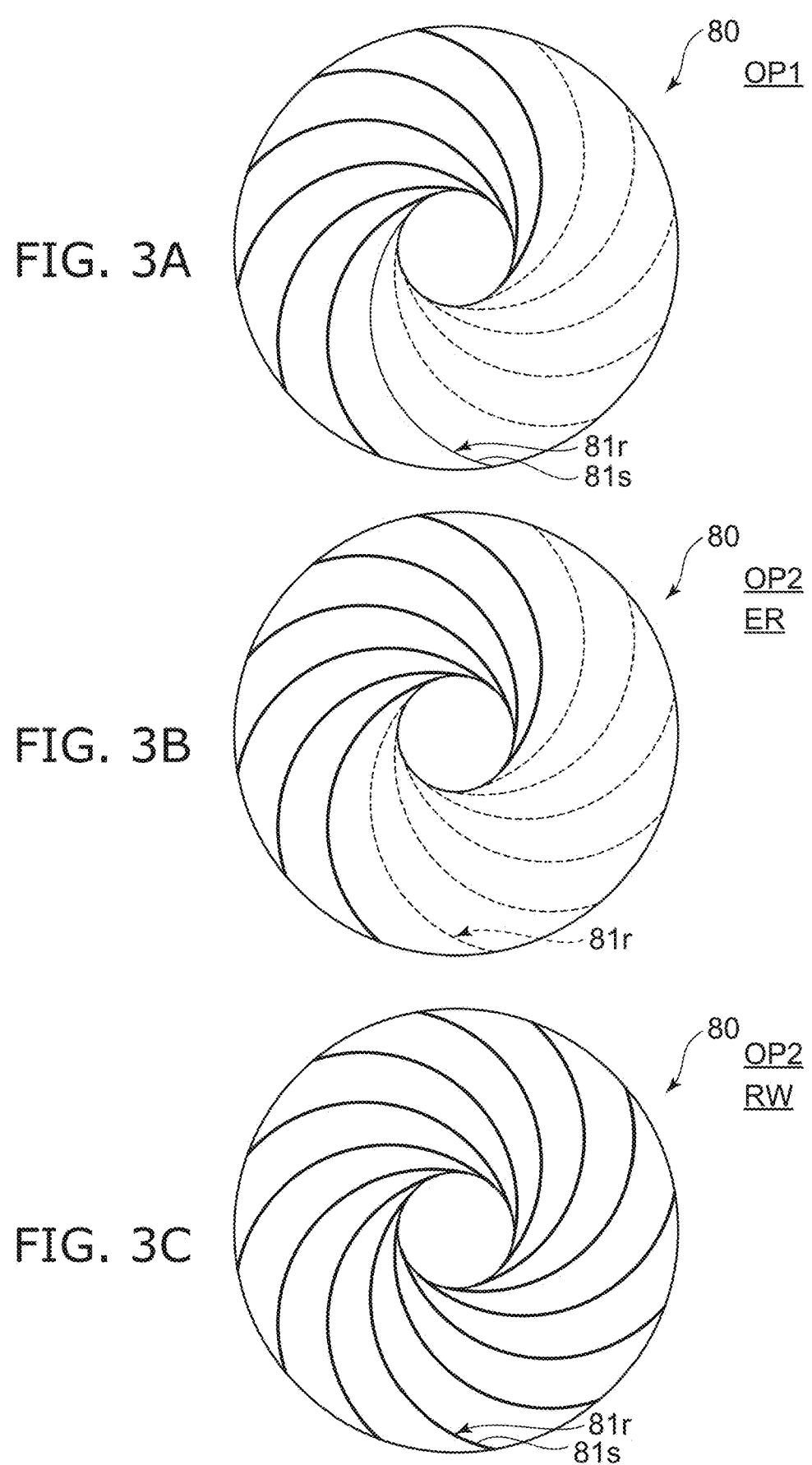
FIGS. 3A to 3C are schematic plan views illustrating the magnetic recording device according to the first embodiment.

FIGS. 3A to 3C are schematic plan views illustrating the magnetic recording device according to the first embodiment.

As shown in FIG. 2, the controller 75 is configured to perform a first operation OP1 and a second operation OP2.

FIG. 3A corresponds to the first operation OP1. In the first operation OP1, the controller 75 records a first servo position information 81s in a first region 81r of the magnetic recording medium 80 (step S10 in FIG. 2). For example, the recording current Iw corresponding to the first servo position information 81s is supplied to the coil 30c. A recording magnetic field based on the recording current Iw is applied to the magnetic recording medium 80, and the first servo position information 81s is recorded in the first region 81r being target.

In the second operation OP2, the controller 75 performs a repair operation RO if the following first condition is not satisfied (step S20 in FIG. 2). The first condition includes that the recording condition of the first servo position information 81s is within a first range being determined. If the first condition is satisfied, the recording condition of the first servo position information 81s is within the first range being appropriate. On the other hand, if the first condition is not satisfied, the recording conditions for the first servo position information 81s are inappropriate.

The controller 75 determines whether such a first condition is satisfied (step S21). In step S21, if the first condition is not satisfied, the repair operation RO is performed. In the repair operation RO, the controller 75 performs an erasing operation ER and a re-recording operation RW.

FIG. 3B illustrates the erasing operation ER. In the erasing operation ER, the controller 75 irradiates the first region 81r with the light 77L from the light emitting section 77 (step S22 in FIG. 2). For example, the temperature of the first region 81r irradiated with the light 77L increases, and the magnetization state of the first region 81r returns to the initial state.

FIG. 3C illustrates the re-recording operation RW. The re-recording operation RW is performed after the erasing operation ER. In the re-recording operation RW, the controller 75 re-records the first servo position information 81s in the first region 81r after the erasing operation ER (step S23 in FIG. 2).

Thereby, the first servo position information 81s can be correctly recorded in the event of an error in which the first condition is not satisfied. Thereby, the magnetic recording medium 80 being defective can be repaired. According to the embodiment, it is possible to provide a magnetic recording device that can improve productivity.

As shown in FIG. 2, in step S21, the controller 75 may determine that the first condition is satisfied. In this case, it is estimated that the first servo position information 81s is appropriately recorded in the first operation OP1. In this case, the repair operation RO is not performed. In this manner, the 15 controller 75 does not perform the repair operation RO in the second operation OP2 if the first condition is satisfied.

In the erasing operation ER described above, the recording current Iw is not supplied to the coil 30c. Alternatively, the current supplied to the coil 30c in the erasing operation ER is smaller than the current supplied to the coil in the first operation OP1. As a result, the first servo position information 81s being erroneous recorded on the magnetic recording medium 80 is stably and effectively erased.

For example, in the first operation OP1, the controller 75 may record the first servo position information 81s in the first region 81r while irradiating the magnetic recording medium 80 with the light 77L. For example, the first servo position information 81s may be recorded by thermally assisted recording.

As described above, the first condition includes that the recording condition of the first servo position information 81s is within the first range being determined. When the thermally assisted recording is performed, the recording condition of the first servo position information 81s may include power supplied to the light source 77S in the first operation OP1. For example, 35 the value of the current supplied to the light source 77S of laser is recorded. When the value of the recorded current is within the determined range (first range), the first condition is satisfied. It is estimated that the first servo position information 81s was normally recorded.

The recording conditions for the first servo position information 81s may further include the recording current Iw supplied to the coil 30c in the first operation OP1. For example, the first condition is satisfied when the recording current Iw is normal. It is estimated that the first servo position information 81s was recorded normally.

The recording conditions of the first servo position information 81s may further include the temperature of the magnetic head 110 in the first operation OP1. The temperature of the magnetic head 110 is detected. The first condition is satisfied when the detected temperature is within normal range. It is estimated that the first servo position information 81s was recorded normally.

The above first condition may further include that the result of detecting the first servo position information 81s recorded in the first region 81r by the first operation OP1 is within a second range being determined. For example, after the first operation OP1, the first servo position information 81s being recorded is detected (reproduced). The first condition is satisfied when the detected condition is within the second range being determined. It is detected that the first servo position information 81s was recorded normally.

In one example, the intensity of the light 77L in the erasing operation ER (intensity during erasing) is higher than the intensity (intensity during recording) of the light 77L in the first operation OP1. Stable erasing can be performed. For example, the intensity in the erasing may be not less than 1.1 times and not more than 3 times the intensity in the recording. The intensity in the erasing may be the same as the intensity in the recording.

For example, the power (for example, current) supplied to the light source 77S in the erasing operation ER may be greater than the power (for example, current) supplied to the light source 77S in the first operation OP1.

As shown in FIG. 3A, the first servo position information 81s may be recorded in each of the plurality of first regions 81r. For example, the first operation OP1 may be repeatedly performed until a desired number of pieces of first servo position information 81s are recorded.

For example, as shown in FIG. 2, after step S23 and when it is determined in step S21 that the first condition is satisfied, the controller 75 performs step S30. In step S30, the controller 75 determines whether the first servo position information 81s has been recorded a determined number of times. If the number of recordings has not reached the determined number, for example, the process returns to step S10. For example, when the number of recordings reaches a determined number, the recording ends.

In the embodiment, the controller 75 may be configured to repeatedly perform the first operation OP1 and the second operation OP2.

The controller 75 may be configured to continuously perform the plurality of second operations OP2 after continuously performing the plurality of first operations OP1.

As shown in FIG. 3A, the first region 81r may have a spiral shape. In the embodiment, the first servo position information 81s may be included in an intermediate pattern for self-servo writing.

Figure 4:
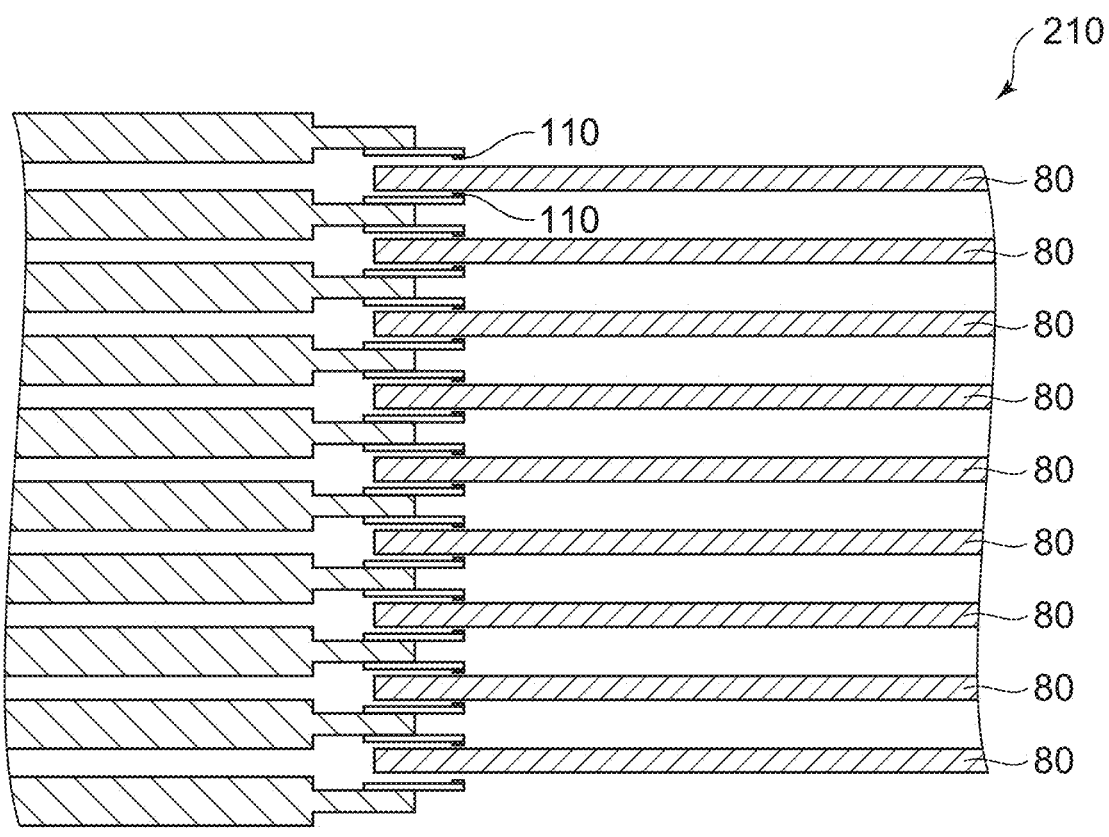
FIG. 4 is a schematic cross-sectional view illustrating a part of the magnetic recording device according to the first embodiment.

FIG. 4 is a schematic cross-sectional view illustrating a part of the magnetic recording device according to the first embodiment.

As shown in FIG. 4, a plurality of magnetic recording media 80 and a plurality of magnetic heads 110 may be provided. The controller 75 may be configured to perform the first operation OP1 and the second operation OP2 for the plurality of magnetic recording media 80 and the plurality of magnetic recording heads 110.

Figure 5:
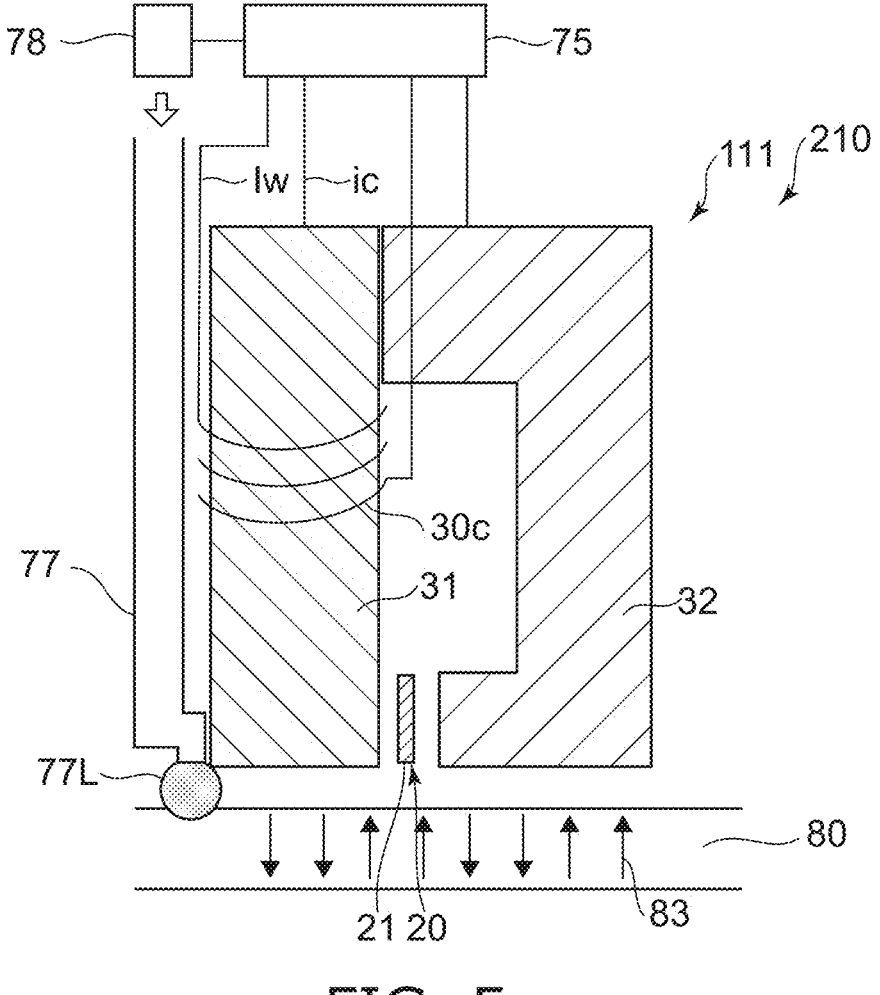
FIG. 5 is a schematic diagram illustrating a magnetic recording device according to the first embodiment.
Figure 6:
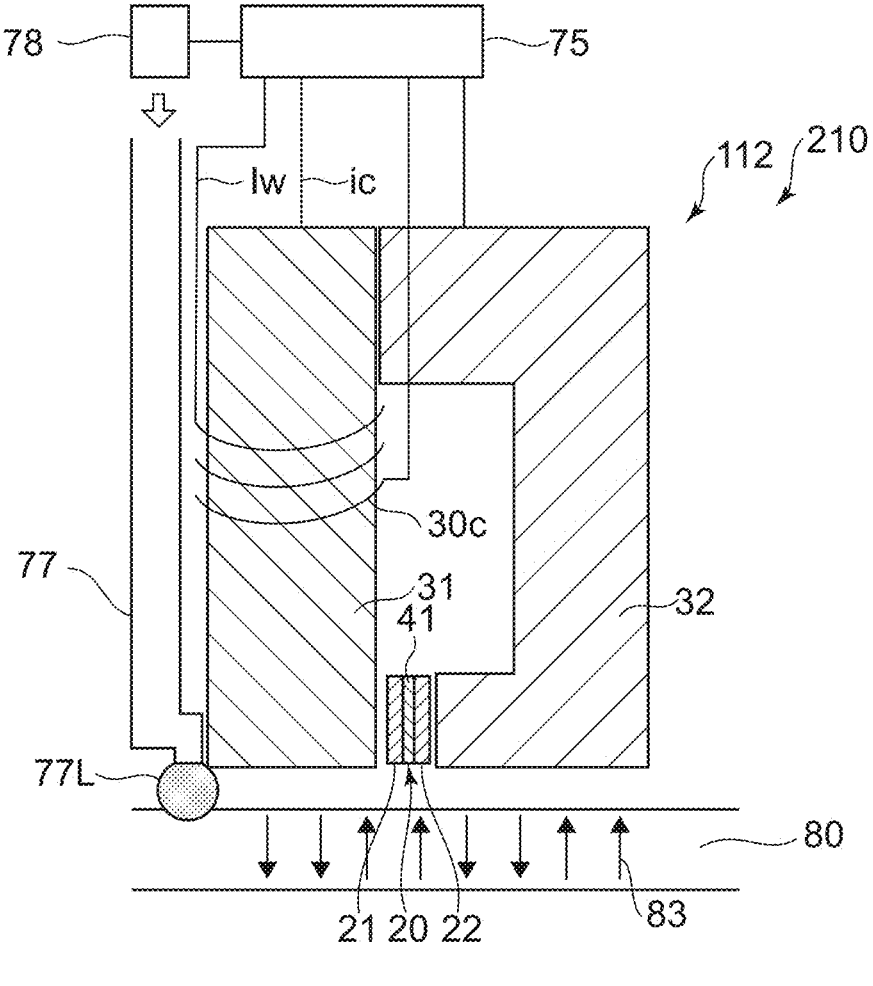
FIG. 6 is a schematic diagram illustrating a magnetic recording device according to the first embodiment.

FIGS. 5 and 6 are schematic diagrams illustrating magnetic recording devices according to the first embodiment.

As shown in FIG. 5, a magnetic head 111 included in the magnetic recording device 210 according to the embodiment further includes the second magnetic pole 32 and a magnetic element 20. The configuration of the magnetic head 111 except for this may be the same as the configuration of the magnetic head 110.

The magnetic element 20 is provided between the first magnetic pole 31 and the second magnetic pole 32. The controller 75 may be configured to supply an element current ic to the magnetic element 20 when the magnetic head 111 records information on the magnetic recording medium 80. As shown in FIG. 5, the magnetic element 20 may include a first magnetic layer 21. The magnetization of the first magnetic layer 21 is controlled by the element current ic. For example, the direction of the recording magnetic field emitted from the first magnetic pole 31 is controlled by the first magnetic layer 21. The recording magnetic field is efficiently applied to the magnetic recording medium 80. High-density recording becomes possible.

As shown in FIG. 6, in a magnetic head 112 included in the magnetic recording device 210 according to the embodiment, the magnetic element 20 further includes a second magnetic layer 22. The configuration of the magnetic head 112 except for this may be the same as the configuration of the magnetic head 111.

The controller 75 may be configured to supply the element current ic to the magnetic element 20 when the magnetic head 112 records information on the magnetic recording medium 80. The magnetization of the magnetic layer included in the magnetic element 20 oscillates by the element current ic. An alternating magnetic field is generated from the magnetic element 20, and the alternating magnetic field is applied to the magnetic recording medium 80. High-density recording becomes possible.

Second Embodiment

The second embodiment relates to a method of manufacturing the magnetic recording device 210. As already explained, the magnetic recording device 210 includes any magnetic head (hereinafter referred to as the magnetic head 110) according to the embodiment. The magnetic recording device 210 includes the magnetic recording medium 80, the magnetic head 110 configured to record information on the magnetic recording medium 80, and the controller 75 configured to control the magnetic recording medium 80 and the magnetic head 110. The magnetic head 110 includes the coil 30c, the first magnetic pole 31, and the light emitting section 77. The first magnetic pole 31 generates the magnetic field according to the recording current Iw supplied to the coil 30c. The light emitting section 77 is configured to irradiate the magnetic recording medium 80 with the light 77L to locally increase the temperature of the magnetic recording medium 80.

In the second embodiment, the controller 75 is configured to perform the first operation OP1 and the second operation OP2. In the first operation OP1, the controller 75 records the first servo position information 81s in the first region 81r of the magnetic recording medium 80. In the second operation OP2, the controller 75 performs the repair operation RO when the first condition is not satisfied. The first condition includes that the recording condition of the first servo position information 81s is within the first range being determined. In the repair operation RO, the controller 75 performs the erasing operation ER of irradiating the first region 81r with the light 77L from the light emitting section 77, and performs the re-recording operation RW of re-recording the first servo position information 81s in the first region 81r after the erasing operation ER.

According to the method for manufacturing the magnetic recording device 210 according to the second embodiment, it is possible to provide a method for manufacturing a magnetic recording device that can improve productivity.

In the second embodiment, the first condition further may include that the result of detecting the first servo position information 81s recorded in the first region 81r by the first operation OP1 is within the second range being determined.

In the second embodiment, in the first operation OP1, the controller 75 may record the first servo position information 81s in the first region 81r while irradiating the magnetic recording medium 80 with the light 77L. The erasing intensity of the light 77L in the erasing operation ER may be higher than the recording intensity of the light 77L in the first operation OP1.

As already explained, the light emitting section 77 may include the light source 77S. The recording conditions for the first servo position information 81s may include the power supplied to the light source 77S in the first operation OP1.

The embodiments may include the following Technical proposals:

(Technical Proposal 1)

A magnetic recording device, comprising:

a magnetic recording medium;

a magnetic head configured to record information on the magnetic recording medium; and a controller configured to control the magnetic recording medium and the magnetic head, the magnetic head including:

a coil;

a first magnetic pole configured to generate a magnetic field according to a recording current supplied to the coil; and a light emitting section configured to irradiate the magnetic recording medium with a light to locally increase a temperature of the magnetic recording medium, the controller being configured to perform a first operation and a second operation, in the first operation, the controller being configured to record a first servo position information in a first region of the magnetic recording medium, in the second operation, the controller being configured to perform a repair operation if a first condition is not satisfied, the first condition including a condition that a recording condition of the first servo position information is within a first range being determined, and in the repair operation, the controller being configured to perform an erasing operation of irradiating the first region with the light from the light emitting section to perform a re-recording operation of re-recording the first servo position information in the first region after the erasing operation.

(Technical Proposal 2)

The magnetic recording device according to Technical proposal 1, wherein the controller does not perform the repair operation when the first condition is satisfied in the second operation.

(Technical Proposal 3)

The magnetic recording device according to Technical proposal 1 or 2, wherein the first condition further includes that a result of detecting the first servo position information recorded in the first region by the first operation is within a second range being determined.

(Technical Proposal 4)

The magnetic recording device according to any one of Technical proposals 1-3, wherein in the first operation, the controller records the first servo position information in the first region while irradiating the magnetic recording medium with the light, and an erasing intensity of the light in the erasing operation is higher than a recording intensity of the light in the first operation.

(Technical Proposal 5)

The magnetic recording device according to Technical proposal 4, wherein the erasing intensity is not less than 1.1 times and not more than 3 times the recording intensity.

(Technical Proposal 6) The magnetic recording device according to Technical proposal 4 or 5, wherein the light emitting section includes a light source, and the recording condition for the first servo position information includes a power supplied to the light source in the first operation.

(Technical Proposal 7)

The magnetic recording device according to Technical proposal 6, wherein the recording condition for the first servo position information further includes the recording current supplied to the coil in the first operation.

(Technical Proposal 8)

The magnetic recording device according to Technical proposal 6 or 7, wherein the recording conditions for the first servo position information further includes a temperature of the magnetic head in the first operation.

(Technical Proposal 9)

The magnetic recording device according to any one of Technical proposals 1-8, wherein in the erasing operation, the recording current is not supplied to the coil.

(Technical Proposal 10)

The magnetic recording device according to any one of Technical proposals 1-8, wherein a current supplied to the coil in the erasing operation is smaller than a current supplied to the coil in the first operation.

(Technical Proposal 11)

The magnetic recording device according to any one of Technical proposals 1-10, wherein the controller is configured to repeatedly perform the first operation and the second operation.

(Technical Proposal 12)

The magnetic recording device according to any one of Technical proposals 1-10, wherein the controller is configured to continuously perform a plurality of the second operations after continuously performing a plurality of the first operations.

(Technical Proposal 13)

The magnetic recording device according to any one of Technical proposals 1-12, wherein the first region has a spiral shape.

(Technical Proposal 14)

The magnetic recording device according to any one of Technical proposals 1-13, wherein the first servo position information is included in an intermediate pattern for self-servo writing.

(Technical Proposal 15)

The magnetic recording device according to any one of Technical proposals 1-14, wherein a plurality of the magnetic recording media and a plurality of the magnetic heads are provided, and the controller is configured to perform the first operation and the second operation for the plurality of magnetic recording media and the plurality of magnetic heads.

(Technical Proposal 16)

The magnetic recording device according to Technical proposal 1, wherein the magnetic head includes a second magnetic pole and a magnetic element provided between the first magnetic pole and the second magnetic pole, and the controller is configured to supply an element current to the magnetic element when the magnetic head records the information on the magnetic recording medium.

(Technical Proposal 17)

A method for manufacturing a magnetic recording device, the method comprising:

manufacturing a magnetic recording device, the magnetic recording device including:

a magnetic recording medium, a magnetic head configured to record information on the magnetic recording medium, and a controller configured to control the magnetic recording medium and the magnetic head, the magnetic head including:

a coil, a first magnetic pole configured to generate a magnetic field according to a recording current supplied to the coil, and a light emitting section configured to irradiate the magnetic recording medium with a light to locally increase a temperature of the magnetic recording medium, the controller being configured to perform a first operation and a second operation, in the first operation, the controller being configured to record a first servo position information in a first region of the magnetic recording medium, in the second operation, the controller being configured to perform a repair operation if a first condition is not satisfied, the first condition including that a recording condition of the first servo position information is within a first range being determined, and in the repair operation, the controller being configured to perform an erasing operation of irradiating the first region with the light from the light emitting section to perform a re-recording operation of re-recording the first servo position information in the first region after the erasing operation.

(Technical Proposal 18)

The method for manufacturing the magnetic recording device according to Technical proposal 17, wherein the first condition further includes that a result of detecting the first servo position information recorded in the first region by the first operation is within a second range being determined.

(Technical Proposal 19)

The method for manufacturing the magnetic recording device according to Technical proposal 17 or 18, wherein in the first operation, the controller is configured to record the first servo position information in the first region while irradiating the magnetic recording medium with the light, and an erasing intensity of the light in the erasing operation is higher than a recording intensity of the light in the first operation.

(Technical Proposal 20)

The method for manufacturing the magnetic recording device according to Technical proposal 19, wherein the light emitting section includes a light source, and the recording conditions for the first servo position information include a power supplied to the light source in the first operation.

According to the embodiment, it is possible to provide a magnetic recording device and a method for manufacturing the same that can improve productivity.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording devices such as magnetic recording medium, magnetic heads, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices and all method for manufacturing the same practicable by an appropriate design modification by one skilled in the art based on the magnetic recording devices and the methods for manufacturing the same described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
a magnetic recording medium;
a magnetic head configured to record information on the magnetic recording medium; and
a controller configured to control the magnetic recording medium and the magnetic head, the magnetic head including:
a coil;
a first magnetic pole configured to generate a magnetic field according to a recording current supplied to the coil; and
a light emitting section configured to irradiate the magnetic recording medium with a light to locally increase a temperature of the magnetic recording medium,
the controller being configured to perform a first operation and a second operation,
in the first operation, the controller being configured to record a first servo position information in a first region of the magnetic recording medium,
in the second operation, the controller being configured to perform a repair operation if a first condition is not satisfied,
the first condition including a condition that a recording condition of the first servo position information is within a first range being determined, and
in the repair operation, the controller being configured to perform an erasing operation of irradiating the first region with the light from the light emitting section to perform a re-recording operation of re-recording the first servo position information in the first region after the erasing operation, wherein
in the first operation, the controller records the first servo position information in the first region while irradiating the magnetic recording medium with the light,
an erasing intensity of the light in the erasing operation is higher than a recording intensity of the light in the first operation, and
the erasing intensity is not less than 1.1 times and not more than 3 times the recording intensity.

2. The device according to claim 1, wherein
the controller does not perform the repair operation when the first condition is satisfied in the second operation.

3. The device according to claim 1, wherein
the first condition further includes that a result of detecting the first servo position information recorded in the first region by the first operation is within a second range being determined.

4. The device according to claim 1, wherein
the light emitting section includes a light source, and
the recording condition for the first servo position information includes a power supplied to the light source in the first operation.

5. The device according to claim 4, wherein
the recording condition for the first servo position information further includes the recording current supplied to the coil in the first operation.

6. The device according to claim 4, wherein
the recording conditions for the first servo position information further includes a temperature of the magnetic head in the first operation.

7. The device according to claim 1, wherein
in the erasing operation, the recording current is not supplied to the coil.

8. The device according to claim 1, wherein
a current supplied to the coil in the erasing operation is smaller than a current supplied to the coil in the first operation.

9. The device according to claim 1, wherein
the controller is configured to repeatedly perform the first operation and the second operation.

10. The device according to claim 1, wherein
the controller is configured to continuously perform a plurality of the second operations after continuously performing a plurality of the first operations.

11. The device according to claim 1, wherein the first region has a spiral shape.

12. The device according to claim 1, wherein the first servo position information is included in an intermediate pattern for self-servo writing.

13. The device according to claim 1, wherein a plurality of the magnetic recording media and a plurality of the magnetic heads are provided, and the controller is configured to perform the first operation and the second operation for the plurality of magnetic recording media and the plurality of magnetic heads.

14. The device according to claim 1, wherein the magnetic head includes a second magnetic pole and a magnetic element provided between the first magnetic pole and the second magnetic pole, and the controller is configured to supply an element current to the magnetic element when the magnetic head records the information on the magnetic recording medium.

15. A magnetic recording device, comprising:
a magnetic recording medium;
a magnetic head configured to record information on the magnetic recording medium; and
a controller configured to control the magnetic recording medium and the magnetic head, the magnetic head including:
  a coil;
  a first magnetic pole configured to generate a magnetic field according to a recording current supplied to the coil; and
  a light emitting section configured to irradiate the magnetic recording medium with a light to locally increase a temperature of the magnetic recording medium, the controller being configured to perform a first operation and a second operation,
in the first operation, the controller being configured to record a first servo position information in a first region of the magnetic recording medium,
in the second operation, the controller being configured to perform a repair operation if a first condition is not satisfied,
the first condition including a condition that a recording condition of the first servo position information is within a first range being determined, and
in the repair operation, the controller being configured to perform an erasing operation of irradiating the first region with the light from the light emitting section to perform a re-recording operation of re-recording the first servo position information in the first region after the erasing operation, wherein
  in the first operation, the controller records the first servo position information in the first region while irradiating the magnetic recording medium with the light,
  an erasing intensity of the light in the erasing operation is higher than a recording intensity of the light in the first operation,
  the light emitting section includes a light source,
  the recording condition for the first servo position information includes a power supplied to the light source in the first operation, and
  the recording conditions for the first servo position information further includes a temperature of the magnetic head in the first operation.

* * * * *